US007387011B2

(12) United States Patent
Fujiki et al.

(10) Patent No.: US 7,387,011 B2
(45) Date of Patent: Jun. 17, 2008

(54) DETERIORATION DIAGNOSIS SYSTEM FOR EXHAUST GAS SENSOR

(75) Inventors: Kenichi Fujiki, Toyoake (JP); Yoshinori Maegawa, Obu (JP); Jonathan Saunders, Warwickshire (GB); Iain Watson, Warwickshire (GB)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/727,877

(22) Filed: Mar. 28, 2007

(65) Prior Publication Data

US 2007/0227124 A1 Oct. 4, 2007

(30) Foreign Application Priority Data

Mar. 28, 2006 (JP) ............................ 2006-087293

(51) Int. Cl.
*G01M 15/10* (2006.01)

(52) U.S. Cl. .................. 73/23.32; 73/31.05; 73/117.3; 123/688; 123/690; 107/109

(58) Field of Classification Search ............... 73/117.3, 73/23.32, 31.05; 123/688, 690; 701/109
See application file for complete search history.

(56) References Cited

U.S. PATENT DOCUMENTS

| | | | | |
|---|---|---|---|---|
| 5,927,260 | A * | 7/1999 | Kishimoto et al. | 123/688 |
| 5,964,208 | A * | 10/1999 | Yamashita et al. | 123/688 |
| 5,970,967 | A * | 10/1999 | Uchikawa | 123/688 |
| 6,286,493 | B1 * | 9/2001 | Aoki | 73/23.32 |
| 7,103,467 | B2 * | 9/2006 | Takahashi et al. | 73/117.3 |
| 7,342,505 | B2 * | 3/2008 | Sasaki et al. | 73/1.06 |
| 2002/0023430 | A1 * | 2/2002 | Takaku et al. | 60/277 |

FOREIGN PATENT DOCUMENTS

| | | |
|---|---|---|
| JP | 01-155257 | 6/1989 |

* cited by examiner

*Primary Examiner*—Erick Solis
(74) *Attorney, Agent, or Firm*—Nixon & Vanderhye PC

(57) ABSTRACT

A diagnosis device calculates a lean-direction responsiveness characteristic and a rich-direction responsiveness characteristic of the exhaust gas sensor. The lean-direction responsiveness represents a responsiveness of the sensor in a case that an air-fuel ratio is controlled in such a manner as to be varied in a lean direction. The rich-direction responsiveness represents a responsiveness of the sensor in a case that the air-fuel ratio is controlled in such a manner as to be varied in a rich direction. The diagnosis device determines whether the exhaust gas sensor deteriorates based on at least one of the lean-direction responsiveness characteristic and the rich-direction responsiveness characteristic, and on a comparison result between the lean-direction responsiveness characteristic and the rich-direction responsiveness characteristic.

6 Claims, 6 Drawing Sheets

DETERIORATION DIAGNOSIS SYSTEM FOR EXHAUST GAS SENSOR

CROSS-REFERENCE TO RELATED APPLICATION

This application is based on Japanese Patent Application No. 2006-87293 filed on Mar. 28, 2006, the disclosure of which is in incorporated herein by reference.

FIELD OF THE INVENTION

The present invention relates to a deterioration diagnosis system for an exhaust gas sensor which is provided in an exhaust pipe of an internal combustion engine.

BACKGROUND OF THE INVENTION

In order to purify an exhaust gas, a catalyst is disposed in an exhaust pipe. An exhaust gas sensor, such as an air/fuel ratio sensor or an oxygen sensor, is arranged upstream of the catalyst in order to control an air-fuel ratio of the exhaust gas. Based on a detected value of the exhaust gas sensor, a quantity of fuel injection is feedback controlled to obtain a target air-fuel ratio. In such a conventional system, a deterioration diagnosis of the exhaust gas sensor is conducted.

JP-A-H01-155257 shows an evaluation method of the exhaust gas sensor performance. In this method, a lean control and a rich control are interchangeably conducted. In the lean control, the air-fuel ratio is changed from a rich condition to a lean condition by varying a fuel injection quantity. In the rich control, the air-fuel ratio is changed from the lean condition to the rich condition. A response time of the exhaust gas sensor is measured in the lean control and the rich control. The response time is a time that is required for the output value of the exhaust gas sensor to be changed from a predetermined first value to a predetermined second value. The evaluation of the exhaust gas sensor performance is conducted based on the response time in the lean control and the response time in the rich control.

It is not always that a responsiveness of an air-fuel ratio sensor deteriorates in a lean direction and a rich direction equally. The responsiveness in only one direction may deteriorate. If the responsiveness deteriorates in only one direction, its effects hardly appear in a deterioration determining parameter. The deterioration determining parameter is represented by an average of a responsiveness characteristic in lean direction and a responsiveness characteristic in rich direction. A difference in deterioration determining parameter may not appear between cases where the air-fuel ratio sensor is normal and where the air-fuel ratio sensor deteriorates in only one direction.

According to inventors' experiment, as shown in FIG. 7, a large part of a dispersion of the deterioration determining parameter are overlapped with each other between the normal air-fuel ratio sensor and the air-fuel ratio sensor deteriorated in one direction of responsiveness. Hence, according to a deterioration diagnosis method in which an average of responsiveness characteristics in the lean and rich directions is used as the deterioration determining parameter, if the responsiveness of the air-fuel ratio sensor deteriorates only in one direction, such deterioration may not be detected with high accuracy.

SUMMARY OF THE INVENTION

An object of the invention is to provide a deterioration diagnosis system for an exhaust gas which can detects its deterioration with high accuracy even if its responsiveness deteriorates only in one direction.

According to the present invention, a deterioration diagnosis system includes a diagnosis device which diagnoses a deterioration of the exhaust gas based on a lean-direction responsiveness characteristic of the exhaust gas sensor and a rich-direction responsiveness characteristic of the exhaust gas sensor. The lean-direction responsiveness represents a responsiveness characteristic of the exhaust gas sensor in a case that an air-fuel ratio detected by the exhaust gas sensor is controlled in such a manner as to be varied in a lean direction. The rich-direction responsiveness represents a responsiveness characteristic of the exhaust gas sensor in a case that the air-fuel ratio detected by the exhaust gas sensor is controlled in such a manner as to be varied in a rich direction. The diagnosis device determines whether the exhaust gas sensor deteriorates based on at least one of the lean-direction responsiveness characteristic and the rich-direction responsiveness characteristic, and on a comparison result between the lean-direction responsiveness characteristic and the rich-direction responsiveness characteristic.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DETAILED DESCRIPTION OF EMBODIMENTS

An embodiment of the invention will be hereinafter described with reference to drawings.

Figure 1:
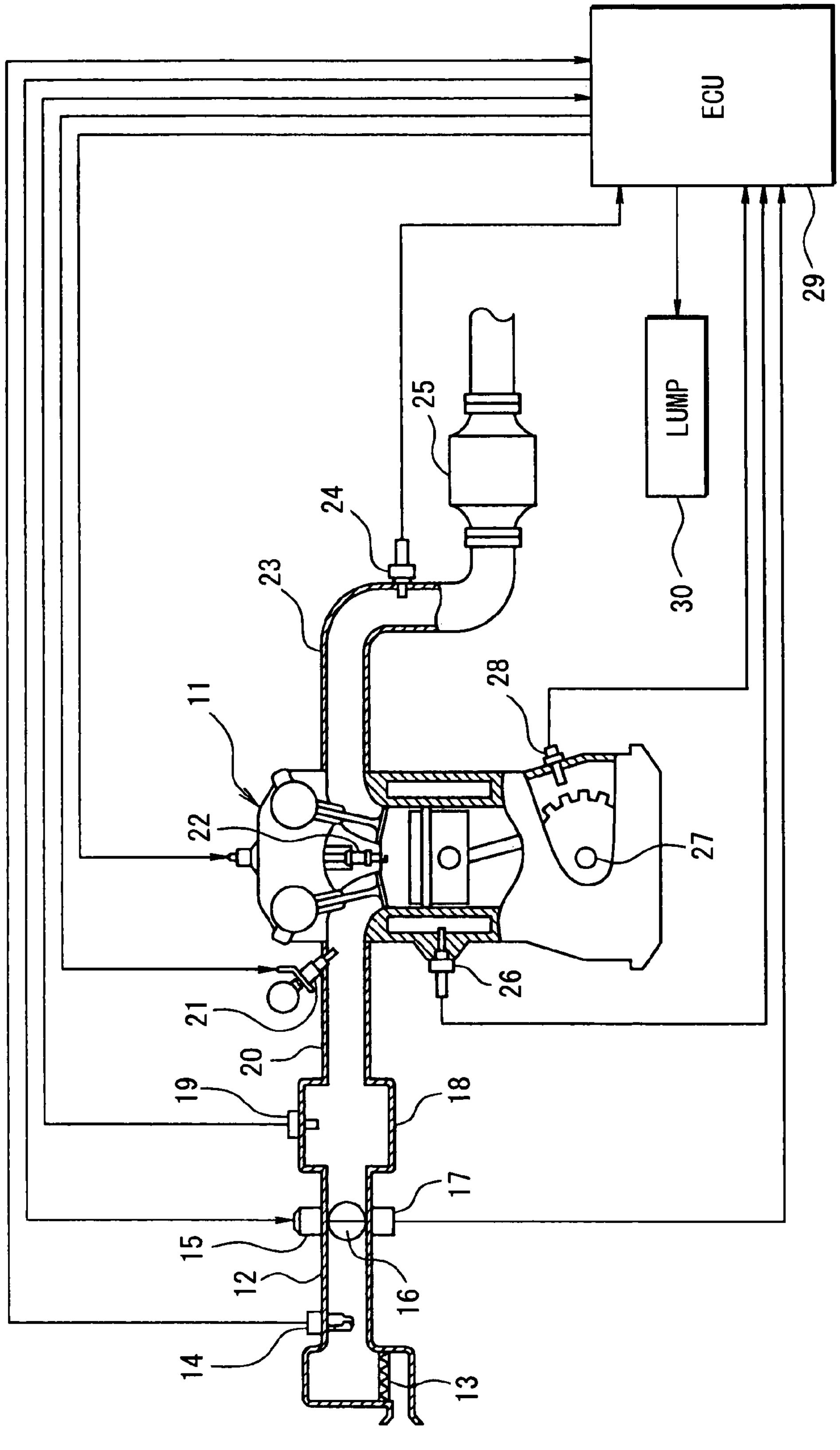
FIG. 1 is a schematic view of an engine control system according to an embodiment of the present invention.

Referring to FIG. 1, a structure of an engine control system is described hereinafter. An air cleaner 13 is arranged upstream of an intake pipe 12 of an internal combustion engine 11. An airflow meter 14 detecting an intake air flow rate is provided downstream of the air cleaner 13. A throttle valve 16 driven by a DC-motor 15 and a throttle position sensor 17 detecting a throttle position are provided downstream of the air flow meter 14.

A surge tank 18 including an intake air pressure sensor 19 is provided down steam of the throttle valve 16. The intake air pressure sensor 19 detects intake air pressure. An intake manifold 20 is connected to the surge tank 18. A fuel injector 21 is mounted on the intake manifold 20 at a vicinity of an intake air port. A spark plug 22 is mounted on a cylinder head of the engine 11 corresponding to each cylinder to ignite air-fuel mixture in each cylinder.

An exhaust pipe 23 of the engine 11 is provided with a three-way catalyst 25 purifying CO, HC, NOx in the exhaust gas. An air-fuel ratio sensor 24 (an exhaust gas sensor) is disposed upstream of the three-way catalyst 25 and detects air-fuel ratio of the exhaust gas.

A coolant temperature sensor 26 detecting a coolant temperature and a crank angle senor 28 outputting a pulse signal every predetermined crank angle of a crankshaft of the engine 11 are disposed on a cylinder block of the engine 11. The crank angle and an engine speed are detected based on the output signal of the crank angle sensor 28.

The outputs from the above sensors are inputted into an electronic control unit 29, which is referred to an ECU hereinafter. The ECU 29 includes a microcomputer which executes an engine control program stored in a ROM (Read Only Memory) to control a fuel injection amount and an ignition timing according to an engine running condition.

The ECU 29 executes an air-fuel ratio feedback control program based on the output of the air-fuel ratio sensor 24. That is, a fuel injection quantity is adjusted so that the air-fuel ratio of the exhaust gas coincides with a target air-fuel ratio. The air-fuel ratio is brought in a range in which the catalyst 25 performs effectively. For example, the air-fuel ratio is brought to around a stoichiometric air-fuel ratio.

The ECU 29 conducts a first diagnosis and a second diagnosis by executing each program for a deterioration diagnosis.

Figure 2:
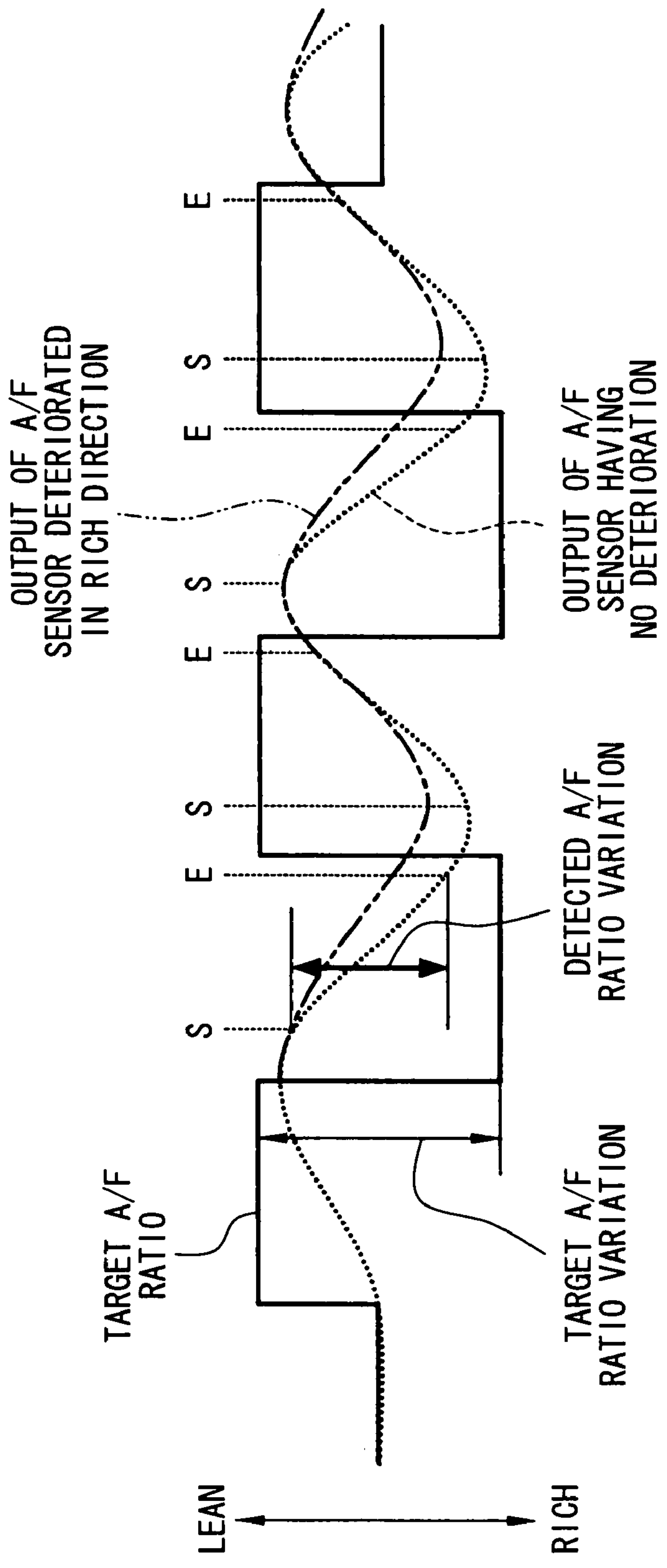
FIG. 2 is a time chart for explaining a deterioration diagnosis for an air-fuel ratio sensor.

In the first diagnosis, when a diagnosis executing condition is established, a fuel injection dither control is executed, as shown in FIG. 2. The fuel injection dither control, which is referred to as the dither control hereinafter, includes a lean control and a rich control. In lean control, the target air-fuel ratio is varied from rich to learn and the fuel injection quantity is decreased, so that the air-fuel ratio of the exhaust gas is varied from rich to lean, which is referred to as a lean direction. In rich control, the target air-fuel ratio is varied from lean to rich and the fuel injection quantity is increased, so that the air-fuel ratio of the exhaust gas is varied from lean to rich, which is referred to as a rich direction. In the dither control, the rich control and the lean control are interchangeably executed.

Every when the target air-fuel ratio is changed, a difference in target air-fuel ratio between before and after the target air-fuel ratio is changed is obtained as a target air-fuel ratio variation. A variation in output of the air-fuel ratio sensor 24 is obtained as a detected air-fuel ratio variation during a predetermined period after the target air-fuel ratio is changed. These operations are repeated predetermined times. An average of target air-fuel ratio variations and an average of the detected air-fuel ratio variations are respectively calculated. The average of the detected air-fuel ratio variations represents an average of the detected air-fuel ration variations in the lean direction and in the rich direction. The average of the detected air-fuel ratio variations is divided by the average of the target air-fuel ratio variations in order to obtain a responsiveness characteristic of the air-fuel ratio sensor 24. The responsiveness characteristic of the air-fuel ratio sensor 24 is referred to as the RCAS hereinafter.

Then, the RCAS is compared with a predetermined deterioration determining value. When the RCAS is smaller than the deterioration determining value, the computer determines that the air-fuel ratio sensor 24 deteriorates in the lean and rich directions. When the RCAS is larger than or equal to the deterioration determining value, the computer determines that the air-fuel ratio sensor 24 does not deteriorate in at least one of the rich direction and the lean direction.

In the second diagnosis, similarly to the first diagnosis, when the predetermined diagnosis executing condition is established, the fuel injection dither control is executed.

When the control is changed to the lean control, a difference in target air-fuel ratio between before and after the control is changed is obtained as a variation in target air-fuel ratio in the lean direction. The variation in output of the air-fuel ratio sensor 24 during a predetermined period after the target air-fuel ratio is changed is obtained as a detected air-fuel ratio variation in the lean direction. When the control is changed to the rich control, a difference in target air-fuel ratio between before and after the control is changed is obtained as a variation in target air-fuel ratio in the rich direction. The variation in output of the air-fuel ratio sensor 24 during a predetermined period after the target air-fuel ratio is changed is obtained as a detected air-fuel ratio variation in the rich direction.

These operations are repeated predetermined times. An average of target air-fuel ratio variations in the lean direction and an average of the target air-fuel ratio variations in the lean direction are respectively calculated. The average of the detected air-fuel ratio variations in the lean direction is divided by the average of the target air-fuel ratio variations in the lean direction in order to obtain a responsiveness characteristic of the air-fuel ratio sensor 24 in the lean direction. The average of the detected air-fuel ratio variations in the rich direction is divided by the average of the target air-fuel ratio variations in the rich direction in order to obtain a responsiveness characteristic of the air-fuel ratio sensor 24 in the rich direction.

The responsiveness characteristic in the lean direction is divided by the responsiveness characteristic in the rich direction to obtain a lean-rich ratio. Furthermore, the responsiveness characteristic in the rich direction is divided by the responsiveness characteristic in the lean direction to obtain a rich-lean ratio.

Then, the responsiveness characteristic in the lean direction is compared with a predetermined deterioration determining value, and the lean-rich ratio is compared with a predetermined deterioration determining value. When the responsiveness characteristic in the lean direction is smaller than the deterioration determining value and the lean-rich ratio is smaller than the deterioration determining value, the computer determines that the air-fuel sensor 24 deteriorates in the rich direction. When the responsiveness characteristic in the lean direction is equal to or larger than the deterioration determining value, or when lean-rich ratio is equal to or larger than the deterioration determining value, the computer determines that the air-fuel sensor 24 does not deteriorated in the lean direction.

Furthermore, the responsiveness characteristic in the rich direction is compared with a deterioration determining value, and the rich-lean ratio is compared with a deterioration determining value. When the responsiveness characteristic in the rich direction is smaller than the deterioration determining value, and when the rich-lean ratio is smaller than the deterioration determining value, the computer determines that the air-fuel sensor 24 deteriorates in the rich direction. When the responsiveness characteristic in the rich direction is equal to or larger than the deterioration determining value, or when the rich-lean ratio is equal to or larger than the deterioration determining value, the computer determines that the air-fuel sensor 24 does not deteriorate in the rich direction.

When it is determined that the air-fuel sensor 24 deteriorates, a deterioration flag is turned ON and an alarm lump 30 is turned ON to notify a driver of the deterioration. Such deterioration information is stored in a backup RAM of the ECU 29.

Processes of each program for deterioration diagnosis will be described referring to FIGS. 3 to 5.

Figure 3:
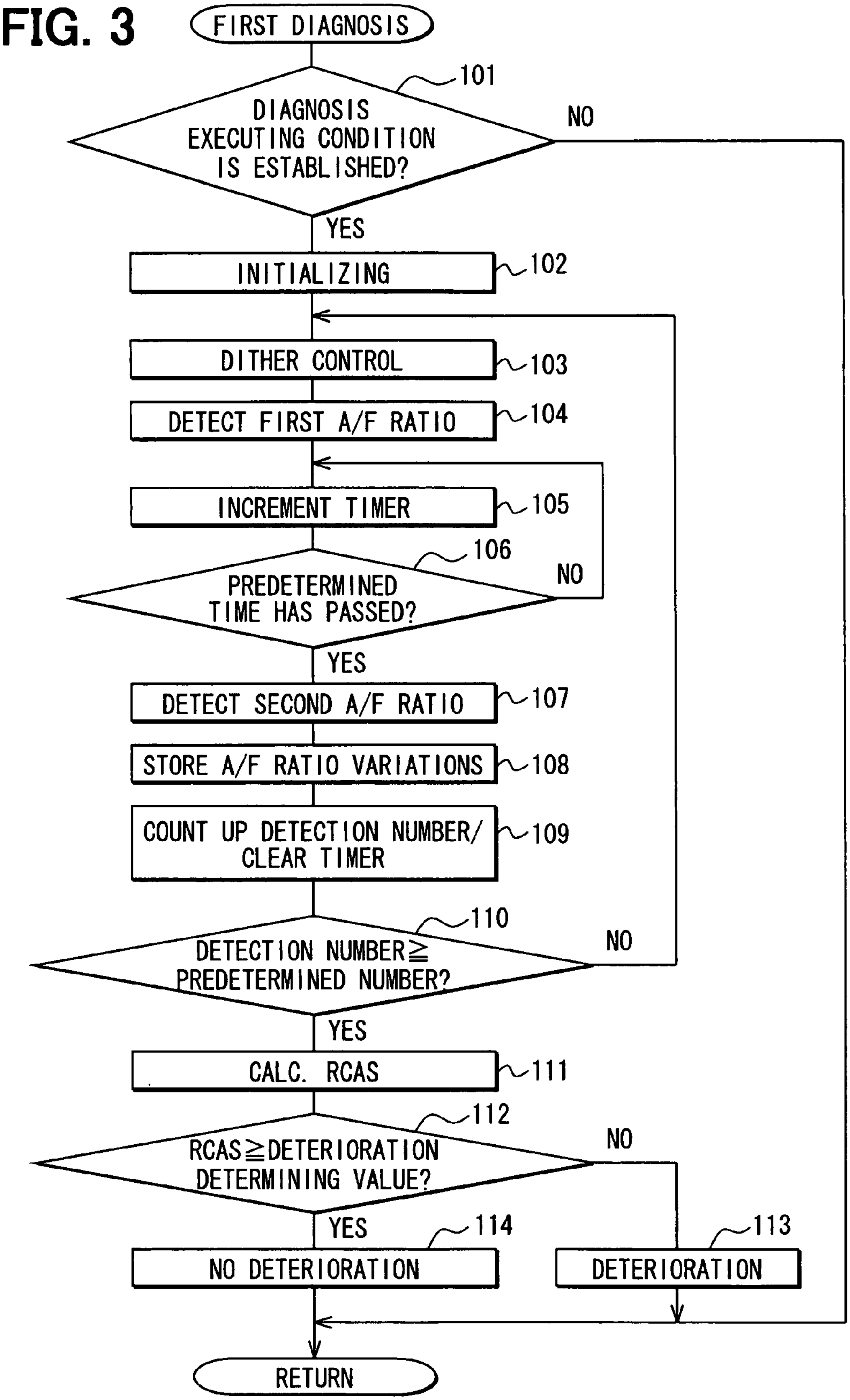
FIG. 3 is a flowchart showing process of a first diagnosis.

FIG. 3 is a flowchart showing a program executed in the first diagnosis. This program is repeatedly executed in a predetermined period while the ECU 29 is ON. In step 101, the computer determines whether the diagnosis executing condition is established based on the following conditions (1), (2).

(1) The air-fuel ratio sensor 24 is activated.

(2) The engine 11 is in an idling state.

When both the conditions (1), (2) are satisfied, the diagnosis executing condition is established. When at least one of the conditions is not satisfied, the diagnosis condition is not established.

When the answer is NO in step 101, the procedure ends without executing successive steps.

When the answer is YES in step 101, the procedure proceeds to step 102 in which an initializing is conducted. In step 103, the dither control is conducted to obtain the difference in target air-fuel ratio between before and after the target air-fuel ratio is changed. This difference corresponds to the target air-fuel ratio variation.

In step 104, at a time S when the target air-fuel ratio is changed, the air-fuel ratio is detected by the air-fuel ratio sensor 24 as a first detected air-fuel ratio. Alternatively, the first detected air-fuel ratio may be measured at a time S at which predetermined time has passed from the target air-fuel ratio change.

In step 105, a timer is incremented. The timer measures an elapsed time after the target air-fuel ratio is changed. In step 106, it is determined whether a predetermined time has passed based on the timer. At a time E at which the predetermined time has passed, the procedure proceeds to step 107. In step 107, the air-fuel ratio detected by the air-fuel sensor 24 is measured as a second detected air-fuel ratio.

In step 108, the difference between the first detected air-fuel ratio and the second detected air-fuel ratio is calculated as the detected air-fuel ratio variation. The detected air-fuel ratio variation and the target air-fuel ratio variation are stored in the RAM.

In step 109, a detection number of the detected air-fuel ratio variation is counted up, and the timer is cleared to zero. In step 110, it is determined whether the detection number of the detected air-fuel ratio variation exceeds a predetermined number. When the answer is NO in step 110, the procedure goes back to step 103. When the answer is YES in step 110, the procedure proceeds to step 111 in which the RCAS is calculated. In step 112, it is determined whether the RCAS is equal to or larger than the deterioration determining value. When the answer is NO in step 112, the procedure proceeds to step 113 in which the computer determines that the air-fuel ratio sensor 24 deteriorates in the lean direction and in the rich direction. When the answer is YES in step 112, the procedure proceeds to step 114 in which the computer determines that the air-fuel ratio sensor 24 does not deteriorated at least one direction.

Figure 4:
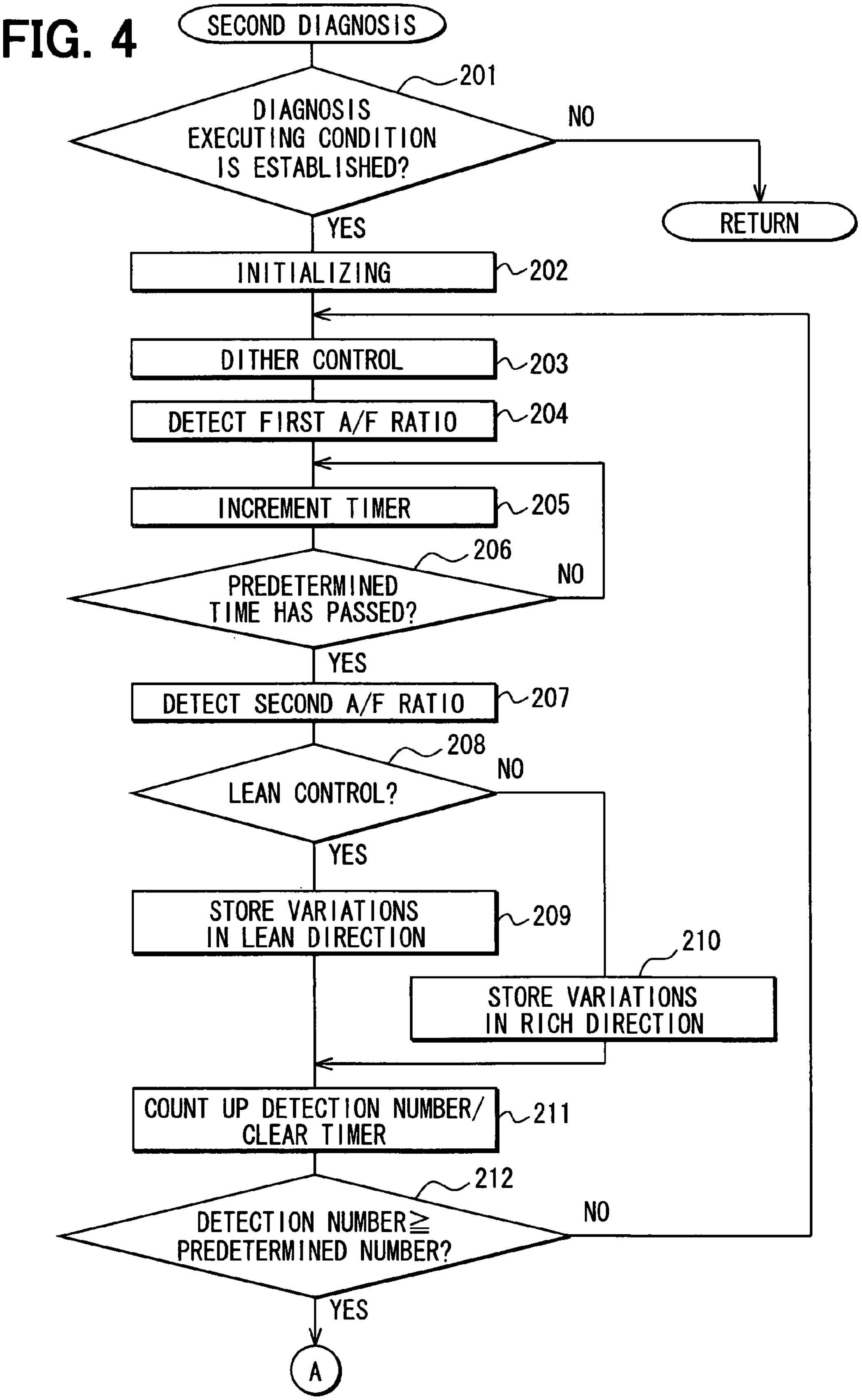
FIG. 4 is a flowchart showing a process of a second diagnosis.
Figure 5:
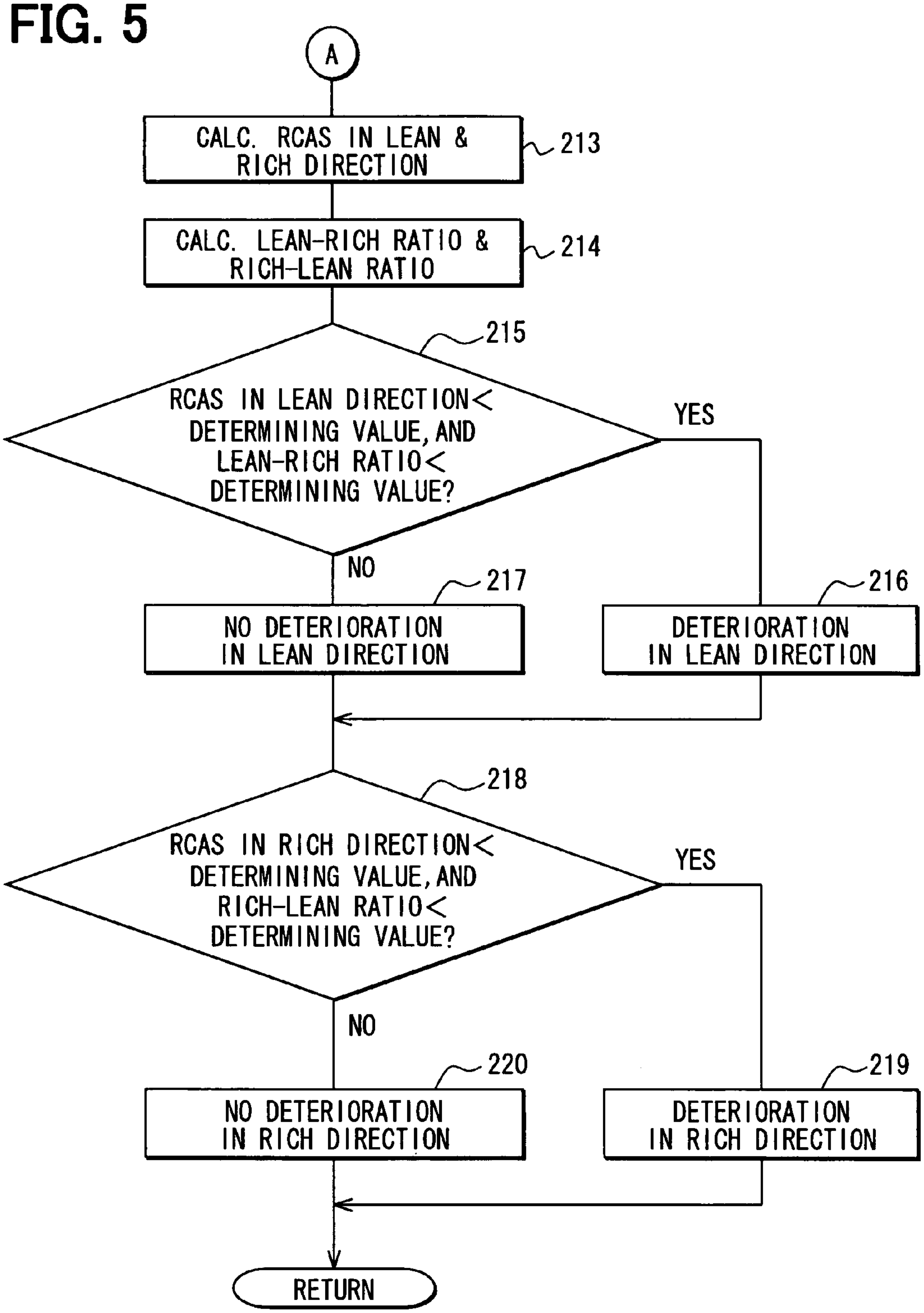
FIG. 5 is a flowchart showing a process of the second diagnosis.

FIGS. 4 and 5 are flowcharts showing a program executed in the second diagnosis.

In step 201, the computer determines whether the diagnosis executing condition is established in the same manner as step 101.

When the answer is YES in step 201, the procedure proceeds to step 202 in which an initializing is conducted. In step 203, the dither control is conducted to obtain the difference in target air-fuel ratio between before and after the target air-fuel ratio is changed. This difference corresponds to the target air-fuel ratio variation.

In step 204, at a time S when the target air-fuel ratio is changed, the air-fuel ratio is detected by the air-fuel ratio sensor 24 as the first detected air-fuel ratio. Alternatively, the first detected air-fuel ratio may be measured at a time S at which predetermined time has passed from the target air-fuel ratio change.

In step 205, a timer is incremented. The timer measures an elapsed time after the target air-fuel ratio is changed. In step 206, it is determined whether a predetermined time has passed based on the timer. At a time E at which the predetermined time has passed, the procedure proceeds to step 207. In step 207, the air-fuel ratio detected by the air-fuel sensor 24 is measured as the second detected air-fuel ratio.

In step 208, the computer determines whether the instant control is the lean control. When the answer is YES in step 208, the procedure proceeds to step 209 in which the difference between the first detected air-fuel ratio and the second detected air-fuel ratio is calculated as the detected air-fuel ratio variation in the lean direction. The detected air-fuel ratio variation in the lean direction and the target air-fuel ratio variation in the lean direction are stored in the RAM.

When the answer is NO in step 208, the procedure proceeds to step 210 in which the difference between the first detected air-fuel ratio and the second detected air-fuel ratio is calculated as the detected air-fuel ratio variation in the rich direction. The detected air-fuel ratio variation in the rich direction and the target air-fuel ratio variation in the rich direction are stored in the RAM.

In step 211, a detection number of the detected air-fuel ratio variation in the lean and the rich direction is counted up, and the timer is cleared to zero. In step 212, it is determined whether the detection number of the detected air-fuel ratio variations exceeds a predetermined number.

When the answer is YES in step 212, the procedure proceeds to step 213 in FIG. 5. In step 213, the average of the detected air-fuel ratio variations in the lean direction is divided by the average of the target air-fuel ratio variations in the lean direction so that the RCAS in the lean direction is obtained. The average of the detected air-fuel ratio variations in the rich direction is divided by the average of the target air-fuel ratio variations in the rich direction so that the RCAS in the rich direction is obtained.

In step 214, the RCAS in the lean direction is divided by the RCAS in the rich direction to obtain the lean-rich ratio. The RCAS in the rich direction is divided by the RCAS in the lean direction to obtain the rich-lean ratio.

In step 215, it is determined whether the RCAS in the lean direction is smaller than the deterioration determining value and the lean-rich ratio is smaller than the deterioration determining value. When the answer is YES in step 215, the procedure proceeds to step 216 in which the computer determines that the air-fuel ratio sensor 24 deteriorates in the lean direction. When the answer is NO in step 215, the procedure proceeds to step 217 in which the computer determines that the air-fuel ratio sensor 24 does not deteriorate in the lean direction.

In step 218, it is determined whether the RCAS in the rich direction is smaller than the deterioration determining value and the rich-lean ratio is smaller than the deterioration determining value. When the answer is YES in step 218, the procedure proceeds to step 219 in which the computer determines that the air-fuel ratio sensor 24 deteriorates in the rich direction. When the answer is NO in step 218, the procedure proceeds to step 220 in which the computer determines that the air-fuel ratio sensor 24 does not deteriorate in the rich direction.

Figure 6:
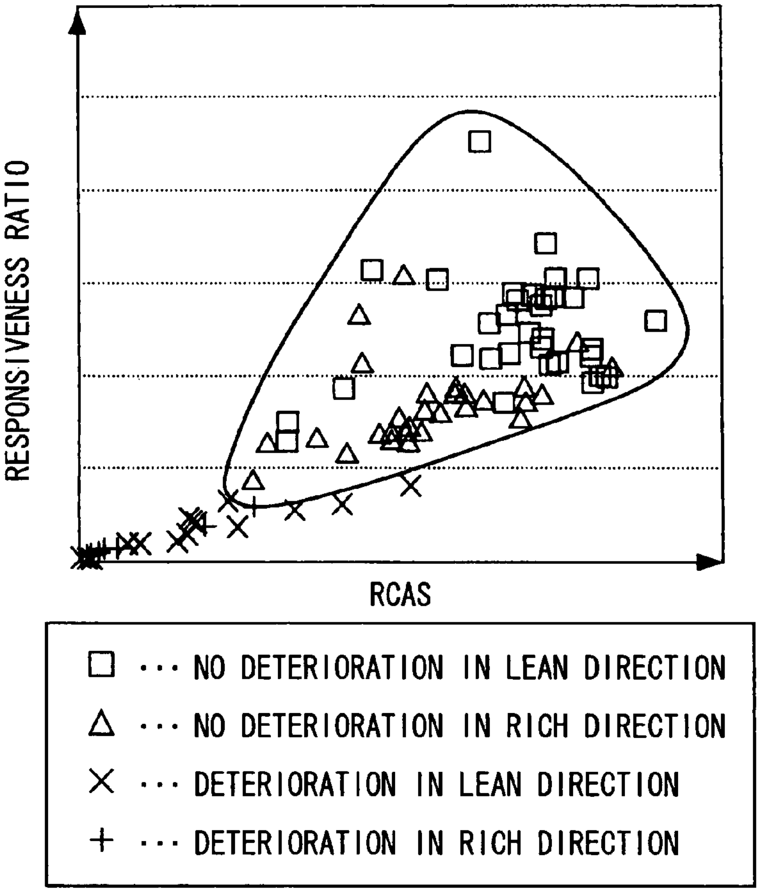
FIG. 6 is a chart showing a dispersion of a deterioration determining parameter in a case that the air-fuel sensor has no deterioration and in a case that the air-fuel ratio sensor deteriorates.
Figure 7:
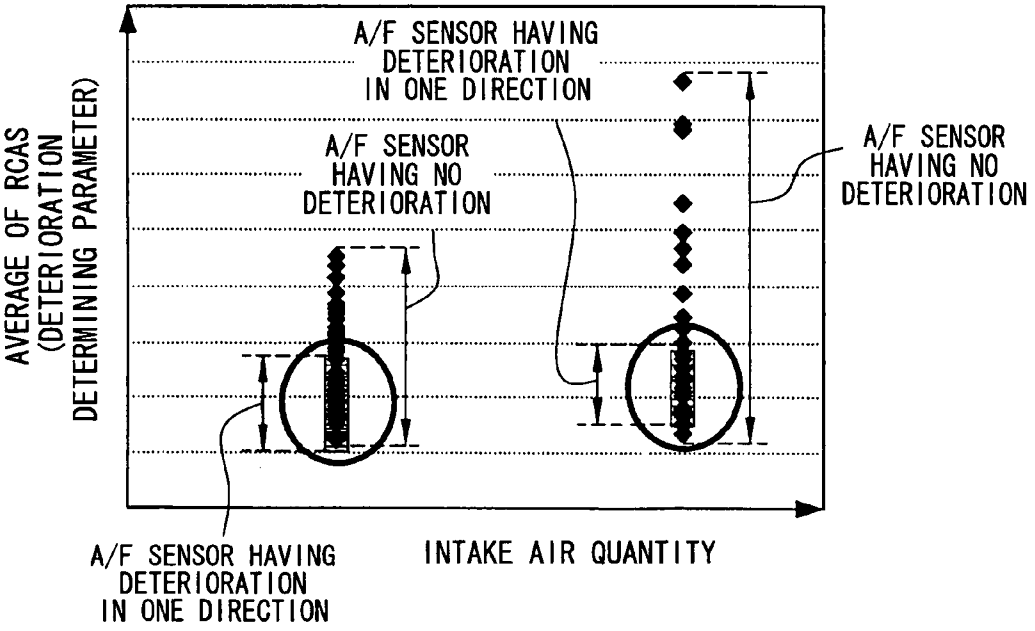
FIG. 7 is a chart showing a dispersion of a deterioration determining parameter according to a related diagnosis.

In a case that the air-fuel ratio sensor 24 has no deterioration, the RCAS in the lean direction and the RCAS in the rich direction are substantially equal to each other. In a case that the air-fuel ratio senor 24 deteriorates only in one direction, one of the RCAS in the rich direction and the lean direction becomes larger than the other one. Hence, a difference in lean-rich ratio or rich-lean ratio will appear between a case that the sensor 24 does not deteriorate and a case that the sensor 24 deteriorates only in one direction. According to the inventors' experiment, as shown in FIG. 6, it becomes apparent that a dispersion in lean-rich ratio or rich-lean ratio of the sensor 24 deteriorated in one direction does not overlap with a dispersion in that of the senor 24 having no deterioration.

According to the instant embodiment, the deterioration of the sensor 24 can be detected both in the lean direction and the rich direction with high accuracy. Even if the sensor 24 deteriorates only in one direction, the deterioration can be detected. Furthermore, the direction in which the sensor 24 deteriorates can be identified.

Incidentally, it is preferable that a driving condition of the engine 11 is stable in order to ensure an accuracy of diagnosis. However, while the vehicle is running, the stable driving condition may not be maintained for a period required to conduct the diagnosis enough. According to the embodiment, the diagnosis is conducted while the engine is in idling condition. Thus, the accuracy of the diagnosis can be assured.

The diagnosis can be conducted in a stable condition of the engine other than the idling state.

According to the embodiment, the lean-rich ratio and the rich-lean ratio are used to diagnose the deterioration. Alternatively, a lean-rich response difference or a rich-lean response difference can be used to diagnose the deterioration. The lean-rich response difference represents "the RCAS in the lean direction—the RCAS in the rich direction." The rich-lean response difference represents "the RCAS in the rich direction—the RCAS in the lean direction."

For example, the RCAS in the lean direction is compared with the deterioration determining value and the lean-rich response difference is compared with a deterioration determining value. When the RCAS in the lean direction is smaller than the deterioration determining value and the lean-rich response difference is smaller than the deterioration determining value, it is determined that the sensor 24 deteriorates in the lean direction. When the RCAS in the lean direction is equal to or larger than the deterioration determining value, or when the lean-rich response difference is equal to or larger than the deterioration determining value, it is determined that the sensor 24 does no deteriorate in the lean direction.

Furthermore, the RCAS in the rich direction is compared with the deterioration determining value and the rich-lean response difference is compared with a deterioration determining value. When the RCAS in the rich direction is smaller than the deterioration determining value and the rich-lean response difference is smaller than the deterioration determining value, it is determined that the sensor 24 deteriorates in the rich direction. When the RCAS in the rich direction is equal to or larger than the deterioration determining value, or when the rich-lean response difference is equal to or larger than the deterioration determining value, it is determined that the sensor 24 does no deteriorate in the rich direction.

A variation or a variation speed of the senor 24 during a predetermined period or a response time required for an output of the sensor to vary a predetermined range can be used as the RCAS.

According to the embodiment, the deterioration diagnosis is applied to the air-fuel ratio sensor 24. Alternatively, the diagnosis can be applied to the exhaust gas sensor other than the air-fuel ratio sensor, such as an oxygen senor.

What is claimed is:

1. A deterioration diagnosis system for an exhaust gas, comprising:

an exhaust gas sensor disposed in an exhaust pipe of an internal combustion engine; and a diagnosis means for diagnosing a deterioration of the exhaust gas based on a lean-direction responsiveness characteristic of the exhaust gas sensor and a rich-direction responsiveness characteristic of the exhaust gas sensor, the lean-direction responsiveness representing a responsiveness characteristic of the exhaust gas sensor in a case that an air-fuel ratio detected by the exhaust gas sensor is controlled in such a manner as to be varied in a lean direction, the rich-direction responsiveness representing a responsiveness characteristic of the exhaust gas sensor in a case that the air-fuel ratio detected by the exhaust gas sensor is controlled in such a manner as to be varied in a rich direction, wherein the diagnosis means determines whether the exhaust gas sensor deteriorates based on at least one of the lean-direction responsiveness characteristic and the rich-direction responsiveness characteristic, and on a comparison result between the lean-direction responsiveness characteristic and the rich-direction responsiveness characteristic.

2. A deterioration diagnosis system according to claim 1, wherein the comparison result is a ratio or a difference between the lean-direction responsiveness characteristic and the rich-direction responsiveness characteristic.

3. A deterioration diagnosis system according to claim 2, wherein the diagnosis means determines that the exhaust gas senor deteriorates when the lean-direction or the rich-direction responsiveness characteristic exceeds a predetermined deterioration determining value and that the ratio between the lean-direction responsiveness characteristic and the rich-direction responsiveness characteristic exceeds a predetermined deterioration determining value.

4. A deterioration diagnosis system according to claim 2, wherein the diagnosis means determines that the exhaust gas sensor deteriorates when the lean-direction or the rich-direction responsiveness characteristic exceeds a predetermined deterioration determining value and that the difference between the lean-direction responsiveness characteristic and the rich-direction responsiveness characteristic exceeds a predetermined deterioration determining value.

5. A deterioration diagnosis system according to claim 1, wherein the diagnosis means is allowed to diagnose the deterioration of the exhaust gas when the internal combustion engine is in idling state.

6. A deterioration diagnosis system for an exhaust gas, comprising:

an exhaust gas sensor disposed in an exhaust pipe of an internal combustion engine; and a diagnosis device diagnosing a deterioration of the exhaust gas based on a lean-direction responsiveness characteristic of the exhaust gas sensor and a rich-direction responsiveness characteristic of the exhaust gas sensor, the lean-direction responsiveness representing a responsiveness of the exhaust gas sensor which detects an air-fuel ratio varying lean, the rich-direction responsiveness representing a responsiveness of the exhaust gas senor which detects the air-fuel ratio varying rich, wherein the diagnosis device determines whether the exhaust gas sensor deteriorates based on at least one of the lean-direction responsiveness characteristic and the rich-direction responsiveness characteristic, and on a comparison result between the lean-direction responsiveness characteristic and the rich-direction responsiveness characteristic.

* * * * *